(12) United States Patent
Salji

(10) Patent No.: US 11,709,944 B2
(45) Date of Patent: Jul. 25, 2023

(54) INTELLIGENT ADVERSARY SIMULATOR

(71) Applicant: Darktrace Limited, Cambridge (GB)

(72) Inventor: Carl Joseph Salji, Bedford (GB)

(73) Assignee: Darktrace Holdings Limited, Cambridge (GB)

( * ) Notice: Subject to any disclaimer, the term of this patent is extended or adjusted under 35 U.S.C. 154(b) by 309 days.

(21) Appl. No.: 17/004,392

(22) Filed: Aug. 27, 2020

(65) Prior Publication Data

US 2021/0064762 A1    Mar. 4, 2021

Related U.S. Application Data

(60) Provisional application No. 62/893,350, filed on Aug. 29, 2019.

(51) Int. Cl.
*G06F 21/57* (2013.01)
*G06F 16/953* (2019.01)
(Continued)

(52) U.S. Cl.
CPC ............ *G06F 21/577* (2013.01); *G06F 9/455* (2013.01); *G06F 16/953* (2019.01); *G06N 5/04* (2013.01);
(Continued)

(58) Field of Classification Search
USPC ..................................................... 726/22–25
See application file for complete search history.

(56) References Cited

U.S. PATENT DOCUMENTS

| 6,154,844 | A  | 11/2000 | Touboul et al. |
| 6,965,968 | B1 | 11/2005 | Touboul |

(Continued)

FOREIGN PATENT DOCUMENTS

| EP | 2922268 A1 | 9/2015 |
| WO | 2001031420 A2 | 5/2001 |

(Continued)

OTHER PUBLICATIONS

Gharan, Shayan Oveis, "Lecture 11: Clustering and the Spectral Partitioning Algorithm" May 2, 2016.
(Continued)

*Primary Examiner* — Kambiz Zand
*Assistant Examiner* — Mahabub S Ahmed
(74) *Attorney, Agent, or Firm* — Rutan and Tucker LLP

(57) ABSTRACT

An intelligent-adversary simulator can construct a graph of a virtualized instance of a network including devices connecting to the virtualized instance of the network as well as connections and pathways through the virtualized instance of the network. Running a simulated cyber-attack scenario on the virtualized instance of the network in order to identify one or more critical devices connecting to the virtualized instance of the network from a security standpoint, and then put this information into a generated report to help prioritize which devices should have a priority. During a simulation, the intelligent-adversary simulator calculates paths of least resistance for a cyber threat in the cyber-attack scenario to compromise a source device through to other components until reaching an end goal of the cyber-attack scenario in the virtualized network, all based on historic knowledge of connectivity and behaviour patterns of users and devices within the actual network under analysis.

20 Claims, 7 Drawing Sheets

(51) Int. Cl.
   *G06N 20/00*        (2019.01)
   *G06F 9/455*        (2018.01)
   *G06N 5/04*         (2023.01)
   *H04L 9/40*         (2022.01)
(52) U.S. Cl.
   CPC ......... *G06N 20/00* (2019.01); *H04L 63/1425* (2013.01)

(56) References Cited

U.S. PATENT DOCUMENTS

| | | |
|---|---|---|
| 7,307,999 B1 | 12/2007 | Donaghey |
| 7,418,731 B2 | 8/2008 | Touboul |
| 7,448,084 B1 | 11/2008 | Apap et al. |
| 7,890,869 B1 | 2/2011 | Mayer et al. |
| 8,312,540 B1 | 11/2012 | Kahn et al. |
| 8,407,798 B1* | 3/2013 | Lotem ............... G06F 21/55 726/21 |
| 8,661,538 B2 | 2/2014 | Cohen-Ganor et al. |
| 8,819,803 B1 | 8/2014 | Richards et al. |
| 8,879,803 B2 | 11/2014 | Ukil et al. |
| 8,881,288 B1* | 11/2014 | Levy ............... G06F 21/577 709/225 |
| 8,966,036 B1 | 2/2015 | Asgekar et al. |
| 9,043,905 B1 | 5/2015 | Allen et al. |
| 9,106,687 B1 | 8/2015 | Sawhney et al. |
| 9,185,095 B1 | 11/2015 | Moritz et al. |
| 9,213,990 B2 | 12/2015 | Adjaoute |
| 9,292,695 B1* | 3/2016 | Bassett ............... G06F 21/577 |
| 9,348,742 B1 | 5/2016 | Brezinski |
| 9,369,484 B1* | 6/2016 | Lacerte ............... H04L 63/1416 |
| 9,401,925 B1 | 7/2016 | Guo et al. |
| 9,516,039 B1 | 12/2016 | Yen et al. |
| 9,516,053 B1 | 12/2016 | Muddu et al. |
| 9,641,544 B1 | 5/2017 | Treat et al. |
| 9,712,548 B2 | 7/2017 | Shmueli et al. |
| 9,727,723 B1 | 8/2017 | Kondaveeti et al. |
| 10,237,298 B1 | 3/2019 | Nguyen et al. |
| 10,268,821 B2 | 4/2019 | Stockdale et al. |
| 10,320,813 B1* | 6/2019 | Ahmed ............... H04L 63/1416 |
| 10,382,473 B1* | 8/2019 | Ashkenazy ......... H04L 63/1466 |
| 10,419,466 B2 | 9/2019 | Ferguson et al. |
| 10,516,693 B2 | 12/2019 | Stockdale et al. |
| 10,659,335 B1* | 5/2020 | Morris ............... H04L 43/50 |
| 10,701,093 B2 | 6/2020 | Dean et al. |
| 10,754,959 B1* | 8/2020 | Rajasooriya ............ G06N 7/01 |
| 10,848,515 B1* | 11/2020 | Pokhrel ............... H04L 63/1433 |
| 11,228,612 B2* | 1/2022 | Vajipayajula ....... H04L 63/1466 |
| 2002/0174217 A1 | 11/2002 | Anderson et al. |
| 2002/0186698 A1 | 12/2002 | Ceniza |
| 2003/0070003 A1 | 4/2003 | Chong et al. |
| 2004/0083129 A1 | 4/2004 | Herz |
| 2004/0167893 A1 | 8/2004 | Matsunaga et al. |
| 2005/0065754 A1 | 3/2005 | Schaf et al. |
| 2006/0021044 A1* | 1/2006 | Cook ............... H04L 63/1433 726/25 |
| 2006/0021046 A1* | 1/2006 | Cook ............... G06F 21/577 726/25 |
| 2006/0021047 A1* | 1/2006 | Cook ............... H04L 63/1433 726/25 |
| 2006/0021048 A1* | 1/2006 | Cook ............... H04L 63/1433 726/25 |
| 2006/0021050 A1* | 1/2006 | Cook ............... H04L 63/1433 726/25 |
| 2007/0118909 A1 | 5/2007 | Hertzog et al. |
| 2007/0294187 A1 | 12/2007 | Scherrer |
| 2008/0005137 A1 | 1/2008 | Surendran et al. |
| 2008/0077358 A1 | 3/2008 | Marvasti |
| 2008/0109730 A1 | 5/2008 | Coffman et al. |
| 2009/0106174 A1 | 4/2009 | Battisha et al. |
| 2009/0254971 A1 | 10/2009 | Herz et al. |
| 2010/0009357 A1 | 1/2010 | Nevins et al. |
| 2010/0058456 A1* | 3/2010 | Jajodia ............... G06F 21/552 726/11 |
| 2010/0095374 A1 | 4/2010 | Gillum et al. |
| 2010/0107254 A1 | 4/2010 | Eiland et al. |
| 2010/0125908 A1 | 5/2010 | Kudo |
| 2010/0235908 A1 | 9/2010 | Eynon et al. |
| 2010/0299292 A1 | 11/2010 | Collazo |
| 2011/0093428 A1 | 4/2011 | Wisse |
| 2011/0213742 A1 | 9/2011 | Lemmond et al. |
| 2011/0261710 A1 | 10/2011 | Chen et al. |
| 2012/0096549 A1 | 4/2012 | Amini et al. |
| 2012/0137367 A1 | 5/2012 | Dupont et al. |
| 2012/0209575 A1 | 8/2012 | Barbat et al. |
| 2012/0210388 A1 | 8/2012 | Kolishchak |
| 2012/0284791 A1 | 11/2012 | Miller et al. |
| 2012/0304288 A1 | 11/2012 | Wright et al. |
| 2013/0091539 A1 | 4/2013 | Khurana et al. |
| 2013/0198119 A1 | 8/2013 | Eberhardt, III et al. |
| 2013/0198840 A1 | 8/2013 | Drissi et al. |
| 2013/0254885 A1 | 9/2013 | Devost |
| 2013/0318616 A1* | 11/2013 | Christodorescu ..... G06F 21/552 726/25 |
| 2014/0007237 A1 | 1/2014 | Wright et al. |
| 2014/0074762 A1 | 3/2014 | Campbell |
| 2014/0165207 A1 | 6/2014 | Engel et al. |
| 2014/0215618 A1 | 7/2014 | Amit |
| 2014/0325643 A1 | 10/2014 | Bart et al. |
| 2015/0058993 A1* | 2/2015 | Choi ............... H04L 63/1433 726/25 |
| 2015/0067835 A1 | 3/2015 | Chari et al. |
| 2015/0081431 A1 | 3/2015 | Akahoshi et al. |
| 2015/0161394 A1 | 6/2015 | Ferragut et al. |
| 2015/0163121 A1 | 6/2015 | Mahaffey et al. |
| 2015/0172300 A1 | 6/2015 | Cochenour |
| 2015/0180893 A1 | 6/2015 | Im et al. |
| 2015/0213358 A1 | 7/2015 | Shelton et al. |
| 2015/0286819 A1 | 10/2015 | Coden et al. |
| 2015/0310195 A1 | 10/2015 | Bailor et al. |
| 2015/0319185 A1 | 11/2015 | Kirti et al. |
| 2015/0341379 A1 | 11/2015 | Lefebvre et al. |
| 2015/0363699 A1 | 12/2015 | Nikovski |
| 2015/0379110 A1 | 12/2015 | Marvasti et al. |
| 2015/0381649 A1* | 12/2015 | Schultz ............... G06Q 10/0635 726/25 |
| 2016/0062950 A1 | 3/2016 | Brodersen et al. |
| 2016/0078365 A1 | 3/2016 | Baumard |
| 2016/0149941 A1 | 5/2016 | Thakur et al. |
| 2016/0164902 A1 | 6/2016 | Moore |
| 2016/0173509 A1 | 6/2016 | Ray et al. |
| 2016/0205122 A1* | 7/2016 | Bassett ............... H04L 63/1416 726/23 |
| 2016/0241576 A1 | 8/2016 | Rathod et al. |
| 2016/0352768 A1 | 12/2016 | Lefebvre et al. |
| 2016/0359695 A1 | 12/2016 | Yadav et al. |
| 2016/0373476 A1 | 12/2016 | Dell'Anno et al. |
| 2017/0046519 A1* | 2/2017 | Cam ............... G06N 7/01 |
| 2017/0048266 A1* | 2/2017 | Hovor ............... H04L 63/1433 |
| 2017/0054745 A1 | 2/2017 | Zhang et al. |
| 2017/0063907 A1 | 3/2017 | Muddu et al. |
| 2017/0063910 A1 | 3/2017 | Muddu et al. |
| 2017/0063911 A1 | 3/2017 | Muddu et al. |
| 2017/0169760 A1 | 6/2017 | Veeramachaneni et al. |
| 2017/0214701 A1* | 7/2017 | Hasan ............... H04L 63/1491 |
| 2017/0270422 A1 | 9/2017 | Sorakado |
| 2018/0027006 A1 | 1/2018 | Zimmermann et al. |
| 2018/0167402 A1 | 6/2018 | Scheidler et al. |
| 2018/0295154 A1* | 10/2018 | Crabtree ............ H04L 63/1433 |
| 2018/0359272 A1* | 12/2018 | Mizrachi ............. H04L 67/535 |
| 2018/0367549 A1* | 12/2018 | Jang ............... G06N 5/022 |
| 2019/0036948 A1 | 1/2019 | Appel et al. |
| 2019/0044963 A1 | 2/2019 | Rajasekharan et al. |
| 2019/0114245 A1* | 4/2019 | Mermoud ......... G06F 11/3466 |
| 2019/0182266 A1* | 6/2019 | Doron ............... H04L 63/1425 |
| 2019/0251260 A1 | 8/2019 | Stockdale et al. |
| 2019/0297096 A1* | 9/2019 | Ahmed ............... H04L 63/1441 |
| 2019/0342307 A1* | 11/2019 | Gamble ............ G06F 16/9024 |
| 2019/0347578 A1* | 11/2019 | Bolding ............ H04L 63/1433 |
| 2020/0177615 A1* | 6/2020 | Grabois ............ G06F 21/577 |
| 2020/0177617 A1* | 6/2020 | Hadar ............... G06F 21/577 |
| 2020/0177618 A1* | 6/2020 | Hassanzadeh ........ G06F 21/552 |
| 2020/0280575 A1 | 9/2020 | Dean et al. |
| 2020/0379079 A1* | 12/2020 | Dupray ............... H04W 64/00 |

(56) References Cited

U.S. PATENT DOCUMENTS

| | | | |
|---|---|---|---|
| 2021/0012012 A1* | 1/2021 | Soroush | H04L 63/1433 |
| 2021/0014256 A1* | 1/2021 | Malhotra | H04L 63/1425 |
| 2021/0021629 A1* | 1/2021 | Dani | H04L 63/1433 |
| 2021/0092153 A1* | 3/2021 | Wei | H04L 45/64 |
| 2021/0120027 A1 | 4/2021 | Dean et al. | |
| 2021/0157919 A1 | 5/2021 | Stockdale et al. | |
| 2021/0367962 A1* | 11/2021 | Kurowski | G06F 21/577 |
| 2021/0409449 A1* | 12/2021 | Crabtree | H04L 63/1441 |
| 2022/0360597 A1* | 11/2022 | Fellows | G06F 21/577 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Nikolystylfw, "Can Senseon beat Darktrace at its very own game with its 'An I triangulation' modern technology?" Dec. 22, 2018, Nikolystylfw.

Lunden, Ingrid, "Senseon raises $6.4M to tackle cybersecurity threats with an AI 'triangulation' approach" Feb. 19, 2019, Tech Crunch.

Senseon Tech Ltd., "The State of Cyber Security SME Report 2019," Jun. 3, 2019.

Senseon Tech Ltd., "Technology," * please see the statement filed herewith.

Senseon Tech Ltd., "Senseon & You," * please see the statement filed herewith.

Senseon Tech Ltd., "Technology Overview," * please see the statement filed herewith.

Senseon Tech Ltd., "Senseon Enterprise," * please see the statement filed herewith.

Senseon Tech Ltd., "Senseon Pro," * please see the statement filed herewith.

Senseon Tech Ltd., "Senseon Reflex," * please see the statement filed herewith.

European Patent Office, Extended European Search Report for Application No. 20193124.3, dated Jan. 22, 2021, 11 pages., Germany.

Stephen Moskal et al., Cyber threat assessment via attack scenario simulation using an integrated adversary and network modeling approach, The Journal of Defense Modeling and Simulation: Applications, Methodology, Technology, vol. 15, No. 1, Aug. 15, 2017, pp. 13-29.

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

* cited by examiner

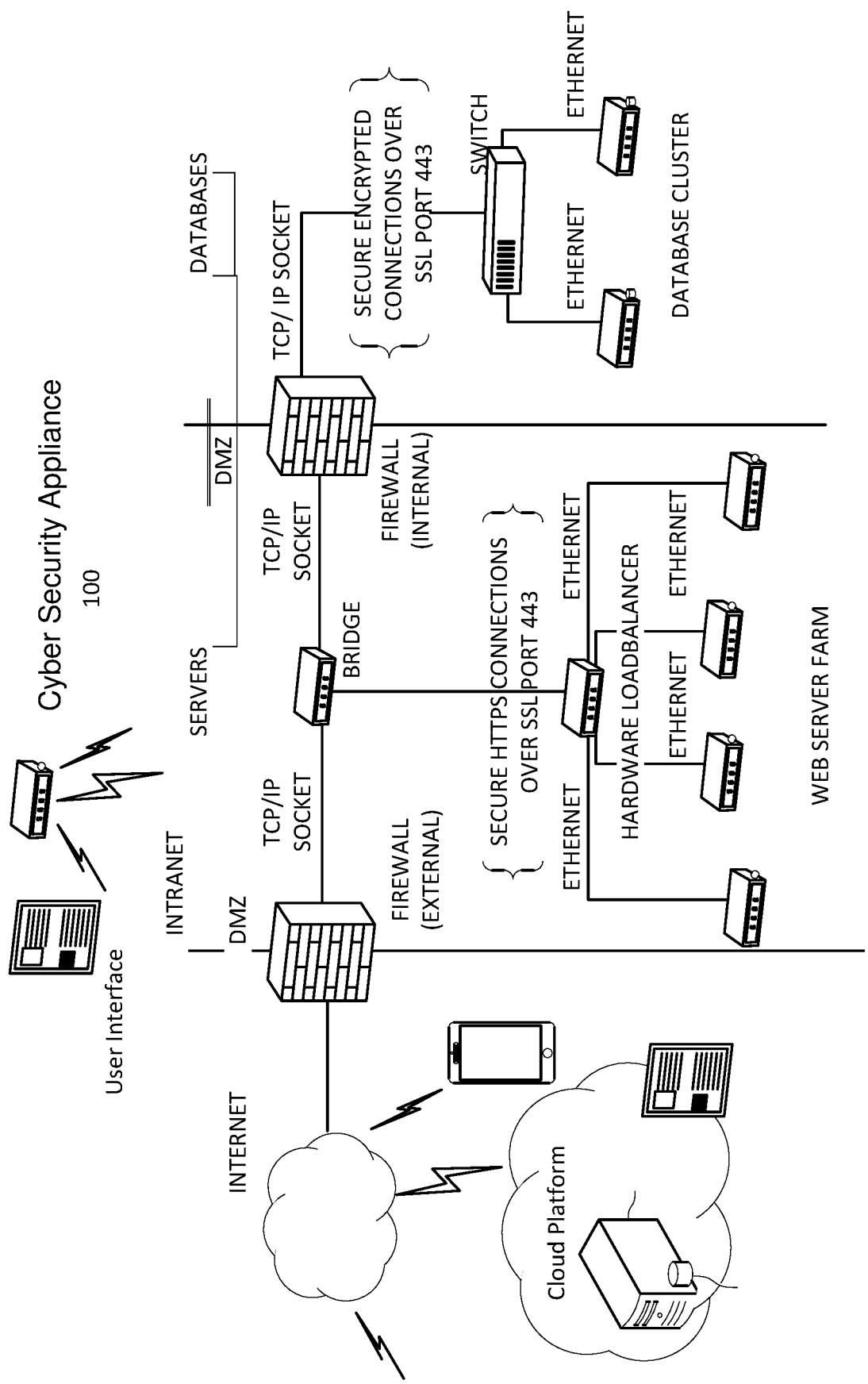
FIG. 7 network

INTELLIGENT ADVERSARY SIMULATOR

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

RELATED APPLICATION

This application claims priority to and the benefit of under 35 USC 119 of U.S. provisional patent application titled "An artificial intelligence based cyber security system," filed Aug. 29, 2019, Ser. No. 62/893,350, which is incorporated herein by reference in its entirety.

BACKGROUND

Existing methods such as vulnerability scanning performed by humans are less targeted and may lead to security resource allocation in the wrong places. Also, some vulnerability scanners actually test and compromise the actual network devices themselves, which may adversely affect the network during this testing and scanning.

Cyber threat protection systems generally ingest network data to detect cyber threats but not to assess how a cyber threat might spread through a network. A human Red team of cyber security professionals typically is hired to test a network's vulnerability to cyber-attacks.

SUMMARY

In an embodiment, an intelligent-adversary simulator can construct a graph of a virtualized instance of a network including i) devices connecting to the virtualized instance of the network as well as ii) connections and pathways through the virtualized instance of the network. The virtualized instance of the network is based on an actual, real-time network under analysis. The graph of the virtualized instance of the network is constructed in order to run a simulated cyber-attack scenario on the virtualized instance of the network in order to identify critical devices connecting to the virtualized instance of the network from a security standpoint, and then put this information into a generated report. The identified critical devices and other information in the report helps prioritize which critical devices connecting to the virtualized instance of the network should have a priority to allocate security resources to them based on the simulated cyber-attack scenario. Note, during a simulation, the intelligent-adversary simulator can calculate one or more paths of least resistance for a cyber threat in the cyber-attack scenario to compromise 1) a virtualized instance of a source device, previously compromised by the cyber threat, 2) through to other virtualized instances of components of the virtualized network, 3) until reaching an end goal of the cyber-attack scenario in the virtualized network. The simulation and compromising of the devices is all based on historic knowledge of connectivity and behaviour patterns of users and devices within the actual network under analysis.

A formatting module can generate the report with the identified critical devices connecting to the virtualized instance of the network that should have the priority to allocate security resources to them. One or more processing units can execute software instructions associated with the intelligent-adversary simulator, the formatting module, and other modules, and AI models in the cyber security appliance. Likewise, one or more non-transitory storage mediums can store at least software associated with the intelligent-adversary simulator, modules, and AI models in the cyber security appliance. The intelligent-adversary simulator can calculate the paths of least resistance from the virtualized instance of the source device through to other virtualized instances of components of the virtualized network until reaching an end goal of the cyber-attack scenario; but not calculate every theoretically possible path from the virtualized instance of the source device to the end goal of the cyber-attack scenario, each time a hop is made from one device in the virtualized network to another device in the virtualized network in order to reduce an amount of computing cycles needed by the one or more processing units as well as an amount of memory storage needed in the one or more non-transitory storage mediums.

These and other features of the design provided herein can be better understood with reference to the drawings, description, and claims, all of which form the disclosure of this patent application.

DRAWINGS

The drawings refer to some embodiments of the design provided herein in which.

Figure 3:
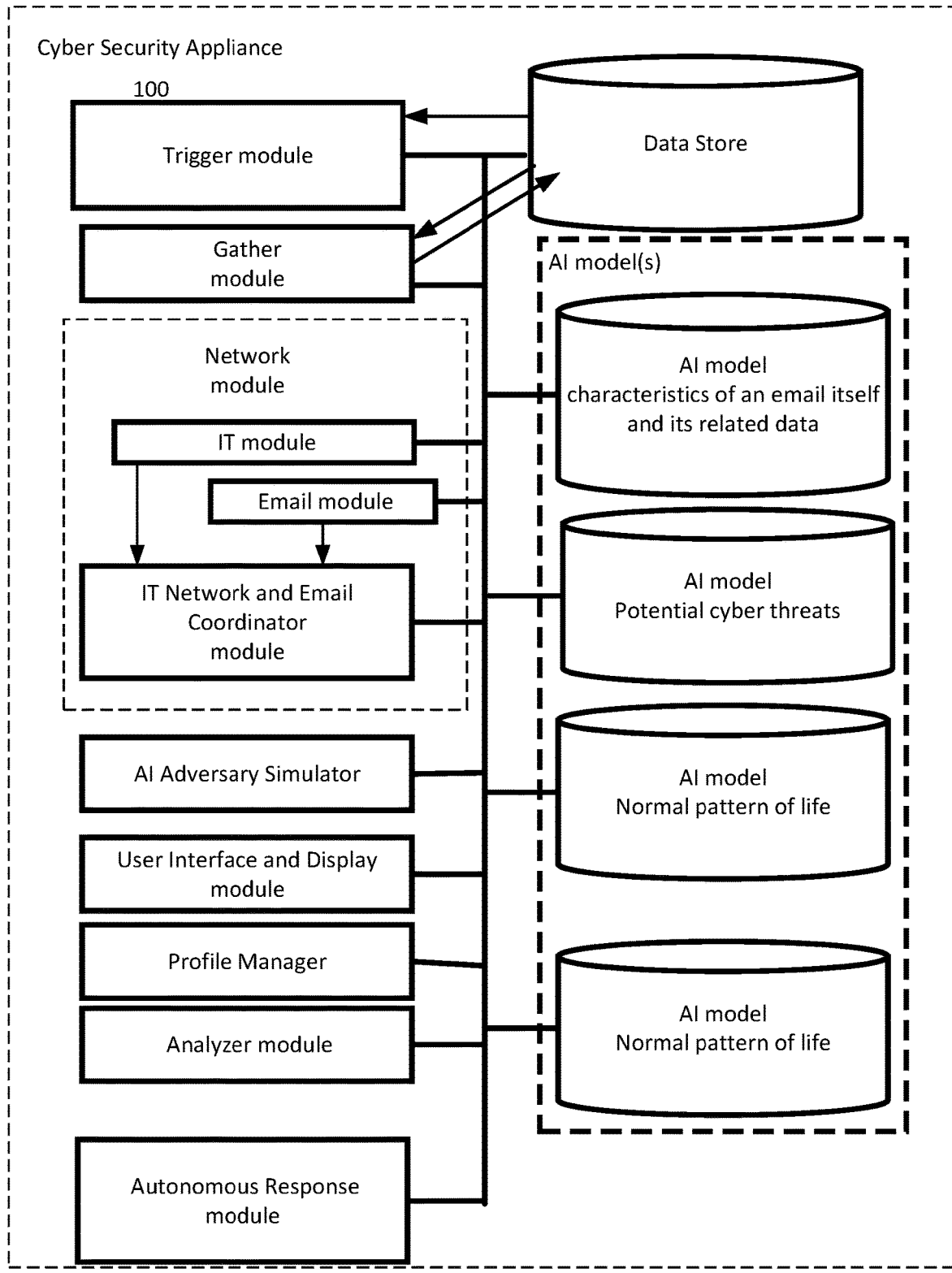

FIG. 3 illustrates a block diagram of an embodiment of an intelligent-adversary simulator configured to integrate within a cyber security appliance and cooperate with components within the cyber security appliance installed and protecting the network from cyber threats by making use of outputs, data collected, and functionality from two or more of a data store, other modules, and one or more AI models already existing in the cyber security appliance.

Figure 4:
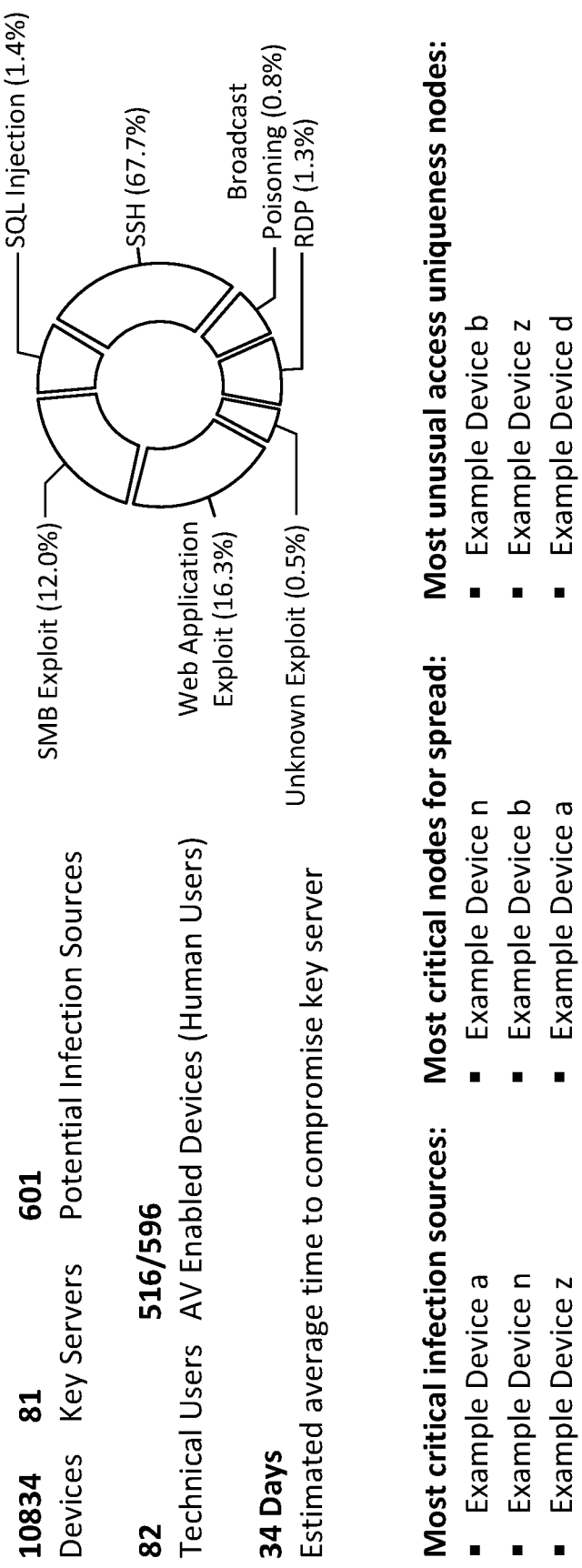

FIG. 4 illustrates a diagram of an embodiment of an example of page of a report from a formatting module that identifies critical devices connecting to the virtualized instance of the network that should have the priority to allocate security resources to them.

Figure 5:
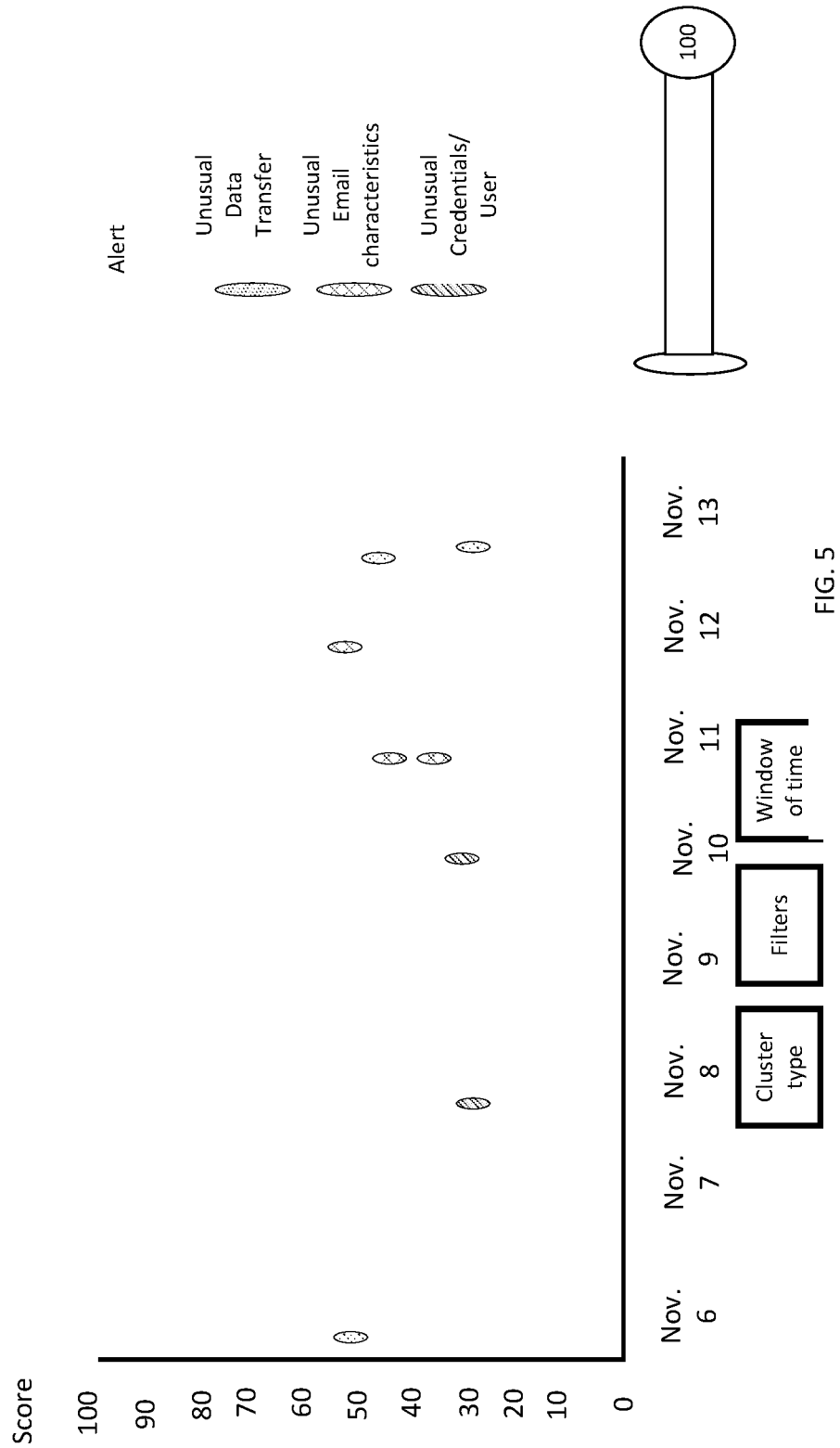

FIG. 5 illustrates a block diagram of an embodiment of an example chain of unusual behaviour for the email(s) deviating from a normal pattern of life in connection with the rest of the network under analysis.

Figure 6:
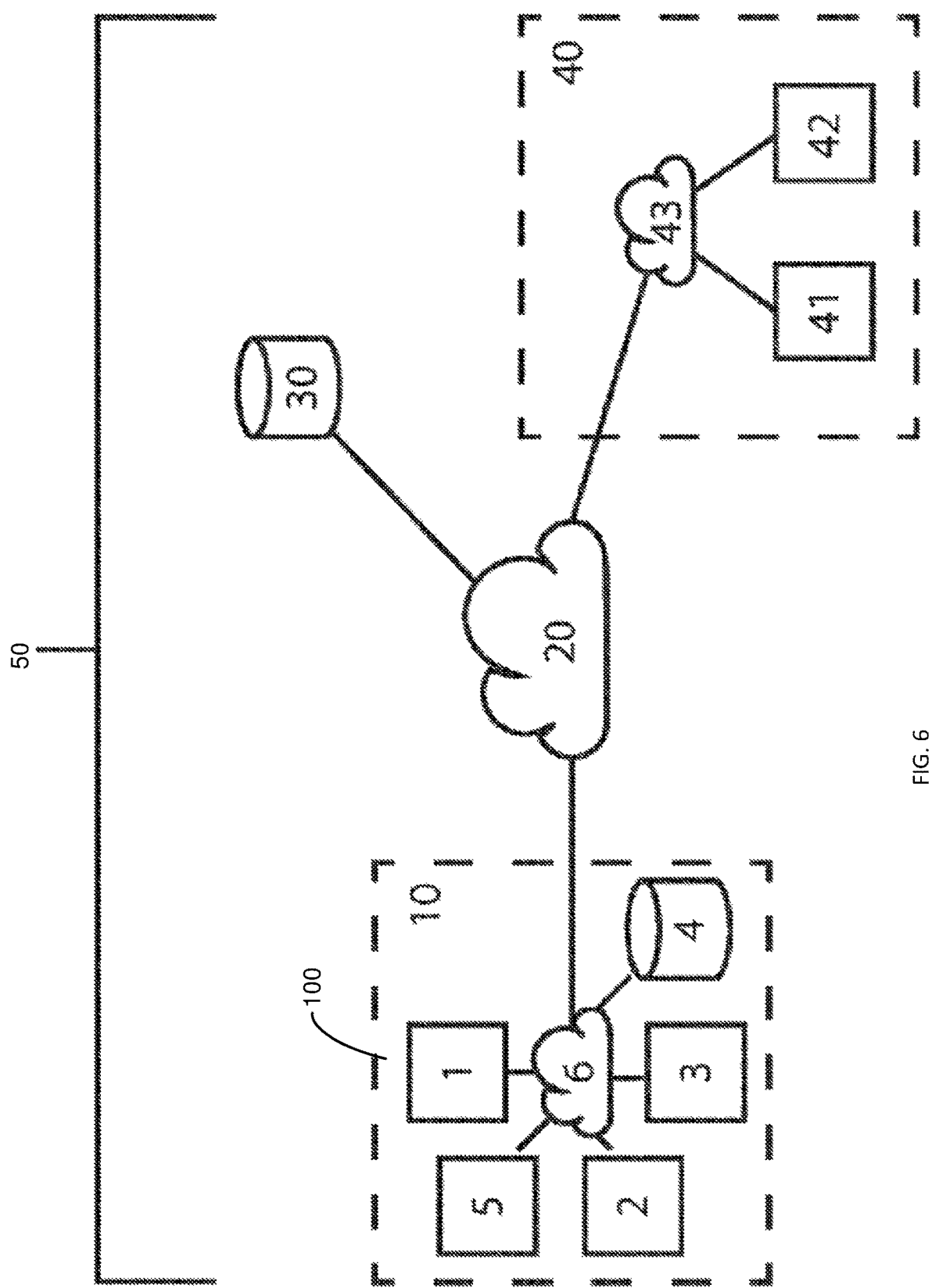

FIG. 6 illustrates an example cyber defence appliance using an intelligent-adversary simulator to protect an example network.

FIG. 7 illustrates an example cyber defence appliance using an intelligent-adversary simulator cooperating with a network module and network probes ingesting traffic data for network devices and network users in the network under analysis.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Figure 1:
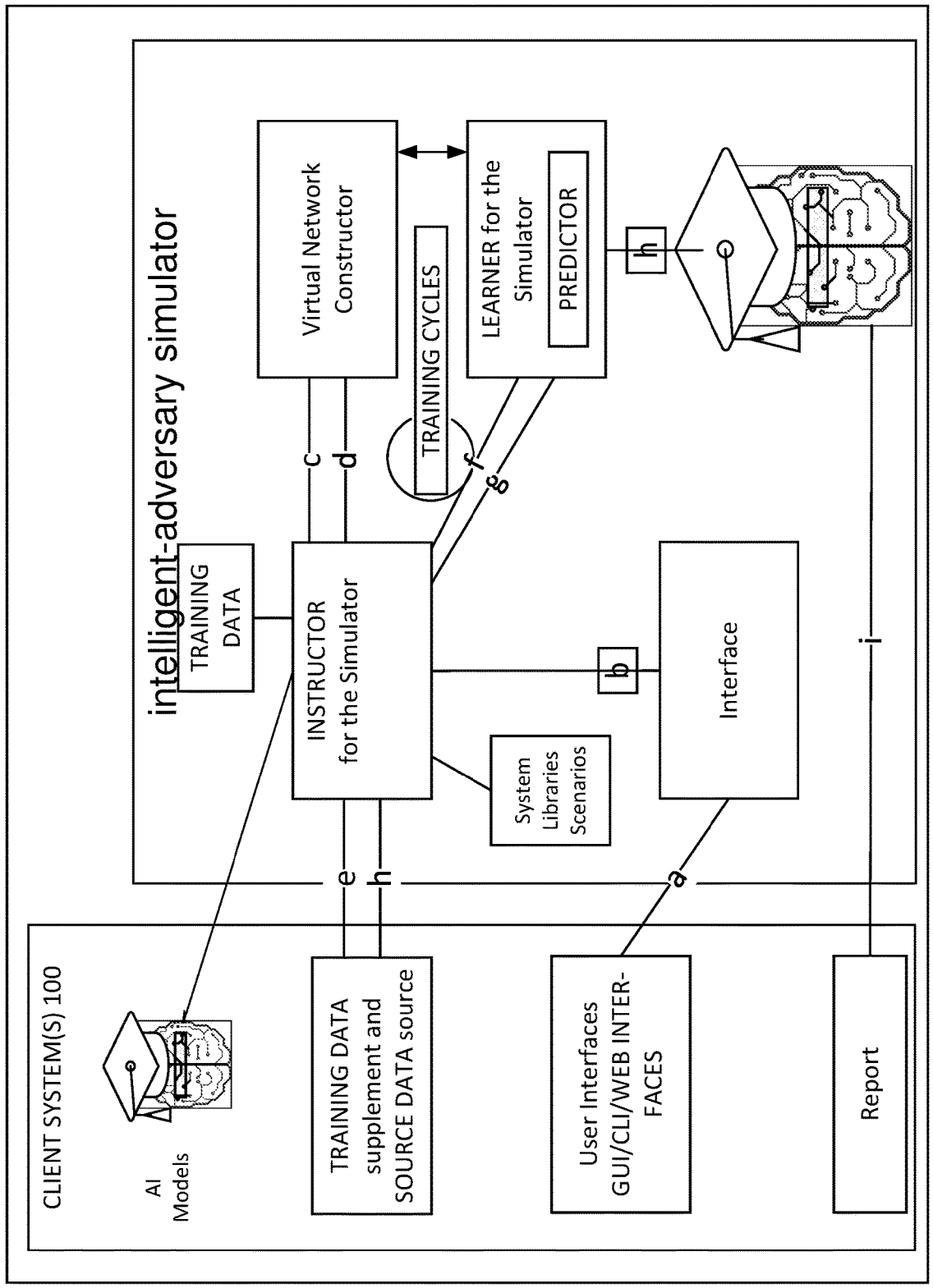
FIG. 1 illustrates a block diagram of an embodiment of an intelligent-adversary simulator configured to construct a graph of a virtualized instance of a network and to simulate the compromise of a spread of the cyber threat being simulated in the simulated cyber-attack scenario on connections between the devices connected to the virtualized network.

FIG. 1 illustrates a block diagram of an embodiment of an intelligent-adversary simulator configured to construct a graph of a virtualized instance of a network and to simulate the compromise of a spread of the cyber threat being simulated in the simulated cyber-attack scenario on connections between the devices connected to the virtualized network. The intelligent-adversary simulator itself can be coded to gather the information it needs from data sources including a cyber security appliance 100 protecting a network, run the simulation(s), and then generate a detailed report with the relevant data. The intelligent-adversary simulator can include components such as an interface, system libraries including cyber-attack scenarios, an instructor conducting, coordinating with external components, and grabbing data for the simulation, training data storage, a virtual network constructor, a learner creating and applying coefficients for machine learning in the simulation as well as other machine learning aspects, and an output with a potential AI report generator.

The intelligent-adversary simulator, such as an AI Threat Hunter, can be coded to use a virtual network constructor to construct a graph of a virtualized instance of a network including i) devices connecting to the virtualized instance of the network as well as ii) all actual connections and pathways through the virtualized instance of the network. The virtualized instance of the network is based on an actual physical network under analysis. The graph of the virtualized instance of the network is constructed in order to for its simulator to run one or more simulated cyber-attack scenarios on the virtualized instance of the network in order to identify one or more, e.g. most, critical devices connecting to the virtualized instance of the network from a security standpoint, and then put this information into a generated report. The report with its observations helps a human cyber professional prioritize which critical devices connecting to the virtualized instance of the network should have a priority to allocate security resources to them based on the simulated cyber-attack scenarios; and thus, by correspondence which actual network devices in the network under analysis should have a priority to allocate security resources to them. Note, during a simulation, the intelligent-adversary simulator can be coded to calculate one or more paths of least resistance for a cyber threat in the cyber-attack scenario to compromise 1) a virtualized instance of a source device, originally previously compromised by the cyber threat, 2) through to other virtualized instances of components of the virtualized network, 3) until reaching an end goal of the cyber-attack scenario in the virtualized network. The graph, data, security, pathways, devices, user behaviour, etc. are all based on actual historic knowledge of connectivity and behaviour patterns of users and devices within the actual network under analysis.

The intelligent-adversary simulator can use the library of cyber-attack scenarios to simulate multiple types of compromise of a given device in a network via cooperation with, for example, the artificial intelligence models trained on cyber threats, and then different goals and purposes of a malicious cyber threat, such set out in the library of cyber-attack scenarios. The compromise of the source device can be an infection spread initial to and then from the source device in the virtualized instance of the network under analysis. The compromise of the source device can be, for example, a wrongful use of access credentials of a user by a malicious actor, unauthorized data exfiltration by a user, a virus/malware, etc. The intelligent-adversary simulator can use adapted versions of AI algorithms and AI models trained originally on the application of graph theory in epidemiology for many of the cyber-attack scenarios to simulate a spread of the cyber-attack through the virtualized instance of the network under analysis. The spread of a disease can be modelled on the connections between individuals and/or devices and then an instructor component can factor in coefficients for ease of transmission between those individuals. The intelligent-adversary simulator has a library of AI algorithms and AI models trained on the application of graph theory to construct a graph of a virtualized instance of a network, its network devices, pathway connectivity within the network, spread. The intelligent-adversary simulator runs an adversary simulation that again has been adapted partially from disease epidemiology theory to automatically identify which devices within an organization's network would cause the most damage to the organization if infected, and then output a report allowing the security team to allocate defensive resources appropriately.

Next, a user interface can be coded to present a menu or window to allow a user to choose how often to periodically initiate and run the simulation as well as program in many customizations.

Figure 2:
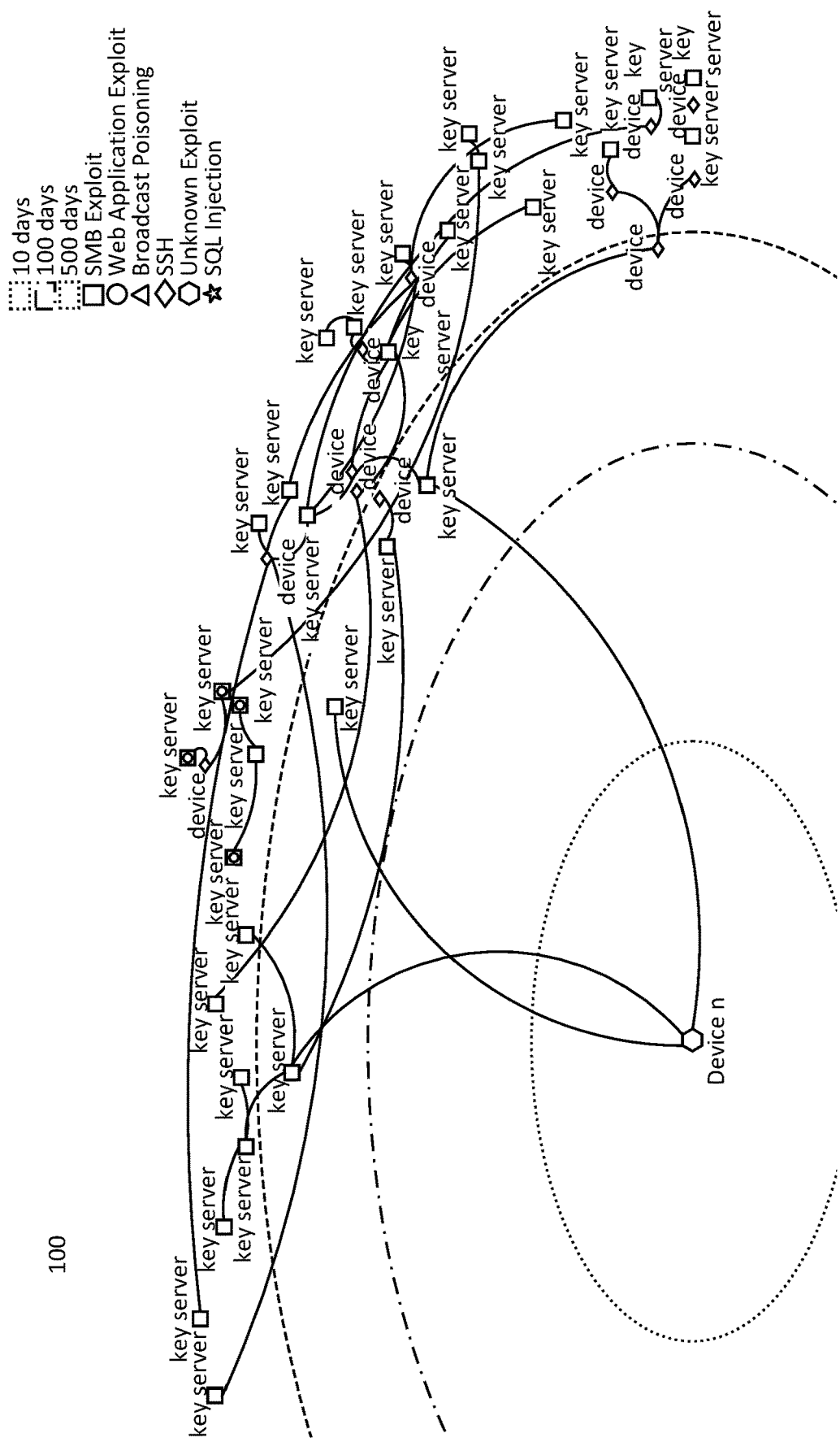
FIG. 2 illustrates a graph of an embodiment of a generated example virtualized network used to simulate the compromise of a spread of the cyber threat being simulated in the simulated cyber-attack scenario on connections between the devices connected to the virtualized network, including key network devices.

FIG. 2 illustrates a graph of an embodiment of a generated example virtualized network used to simulate the compromise of a spread of the cyber threat being simulated in the simulated cyber-attack scenario on connections between the devices connected to the virtualized network, including key network devices. The intelligent-adversary simulator can be coded to create the graph of the virtualized network, with its nets and subnets. Each device connecting to the virtualized network is represented as a node in the graph. Two or more of the devices connecting to the virtualized network are assigned with different weighting resistances to malicious compromise from the cyber threat being simulated each of the cyber-attack scenarios during the simulation. As discussed later, some devices will be easier to compromise and some will be harder to compromise.

FIG. 2 shows the example constructed graph of a virtualized instance of a network including i) devices connecting to the virtualized instance of the network as well as ii) connections and pathways through the virtualized starting from a source (reduced to a portion of the graph due to size restrictions of this drawing). The source device 'n' is initially compromised by a cyber threat and the end results of a spread of the compromise in a simulation of an example cyber-attack scenario. The dotted circular lines going out from the source device 'n' represent bands of time, such as an amount of days e.g. 10 days, 100 days, etc., before various devices on the network will likely be compromised by a given cyber threat in the example cyber-attack scenario. The intelligent-adversary simulator constructs a graph for all devices on each of the subnets in the network that source device 'n' can possibly connect to or get to. The intelligent-adversary simulator starts off with an assumption that all systems are vulnerable and for each hop in the network, the algorithm seeks the path of least resistance to get closer to the end goal of the cyber-attack scenario while factoring in profile tags of users and devices, restricted subnets, and other defence mechanisms, such as firewalls, antivirus programs based on matching known virus signatures cooperating with the cyber security appliance 100, etc., are used to make corresponding devices less vulnerable to compromise from the cyber threat. All paths can be considered by the intelligent-adversary simulator (even an unknown exploit or social engineering exploit that shouldn't be a possible pathway through the network) and then the quickest is sought, rather than searching for known vulnerabilities in the whole network and then plotting a course. Note, an end goal algorithm can be triggered to back track a number of compromised devices to calculate a time duration to taking alternative pathways when the last 'x' number of hops through compromised devices does not significantly get the spread of the cyber-attack closer to achieving the end goal of that cyber-attack scenario. The intelligent-adversary simulator can be coded to search and query i) ingested network traffic data as well as ii) analysis on that network traffic data from a data store, from one or more modules, and from one or more AI models within the cyber security appliance 100. The intelligent-adversary simulator has access to and obtains a wealth of actual network data from the network under analysis from, for example, the data store, modules, and the AI models of normal pattern of life for entities in the network under analysis, which means thousands of paths of least resistance through possible routes in this network can be computed during the simulation even when one or more of those possible routes of least resistance 1) are not previously known or 2) have not been identified by a human before to determine a spread of the cyber threat from device-to-device. The network module of the cyber threat defence appliance already maintains a map of historic connectivity between all devices in the network in order to detect 'new' connections as well as model the normal traffic patterns from components connecting to the network, so the intelligent-adversary simulator can use this as a map of all possible routes to hop to. The intelligent-adversary simulator looks at all known devices that device 'n' has connected to, and the ports and other connection pathways each of these devices used to send traffic or otherwise communicate with each other and devices external to the network, and then calculates the weighting of how difficult it would be to infect/compromise each device. Note the difficulty to compromise a device can be a representation of time taken to infect/compromise a device with the cyber-attack. Difficulty can be calculated based upon the assigned profile tag of the target device. For example, as discussed in more detail below, a device with a profile tag of e.g. Windows XP or LLMNR with a human user would have a weighting of 1 (easiest) to transmit to. Note, devices with profile tags of an Anti-Virus User or Technical user tags would get a slight defence boost which reduces their weighting meaning a longer time to compromise this device.

The intelligent-adversary simulator can also look at other factors. The intelligent-adversary simulator also identifies recent credentials seen on device 'n' and looks for their use on other devices (as attackers dump credentials from memory on infected devices). The intelligent-adversary simulator can take in manual input on restricted subnets and other factors from the user interface window presented to the user. However, as discussed before, by having access to a wealth of network data from the data store and other components inside that the cyber security appliance 100, then the intelligent-adversary simulator can impliedly figure out restricted subnets for each device on the network and pathways unknown to human cyber professionals operating this network. For example, when the historic records show device 'n' has never accessed any device in a given subnet, then it is likely device 'n' is restricted from having access to that given subnet. In addition, a likelihood of the compromise of a virtual device being simulated is tailored and accurate to the corresponding actual device being simulated because the cyber-attack scenario is based upon security credentials and behaviour characteristics from actual traffic data fed to the modules, data store, and AI models of the cyber security appliance 100.

Again, some similar concepts and AI training from the mathematical modelling of infectious disease spreading can be applied to cyber threats such as software viruses, malware, insider data theft, and other forms of malicious cyber threats spreading and attacking entities on a network, including key servers. The intelligent-adversary simulator can be coded to determine how likely a cyber-attack can spread in a determined amount of time, such as hours, days, etc., to successfully infect/compromise 1) all components, 2) a maximum amount of components within a given time duration, 3) 'x' amount of key servers, 4) or other end goal selected by default or set by the user on the network. The intelligent-adversary simulator can model the spread of a cyber-attack by drawing a graph of a devices connected a subnet and each subnet making up a network and then weighting the graph based upon how likely it would be for the cyber-attack to spread. Also, the intelligent-adversary simulator can be coded to determine how severe it is when a particular component that the malicious cyber threats spread to, is infected.

The intelligent-adversary simulator can be coded to use these AI models initially trained on spread of disease, which are then retrained on the spread of malicious cyber threats through different devices on a network. Machine learning can repurpose graph theory analysis from other applications such as epidemiology to the lateral movement of an attacker through a network. The re-training combines i) knowledge of cyber threats, ii) knowledge of 1) security features and credentials, and 2) characteristics of network devices, and iii) other network specific information, such as information technology network information, email network information, SaaS environment information, Cloud information, etc., and iii) previous concepts and training from the mathematical modelling of infectious diseases to analyse network systems, (e.g. email, IT network, SaaS, cloud, industrial networks, etc.) under analysis and make targeted predictions as well as provide validation of theories via the predictor component and then provide a detailed generated report (See FIG. 1).

The intelligent-adversary simulator can be coded to search and query:

generally all of, but at least two or more of i) a data store, ii) other modules, and iii) one or more Artificial Intelligence models making up a cyber security appliance 100 protecting the actual network under analysis from cyber threats, on what, i) the data store, ii) the other modules, and iii) the one or more Artificial Intelligence models in the cyber security appliance 100, already know about the network, and its components, under analysis to create the graph of the virtualize instance of the network (See also FIG. 3).

The graph of the virtualize instance of the network is created with generally all of, but at least two or more of: 1) known characteristics of the network itself, 2) pathway connections between devices on that network, 3) security features and credentials of devices and/or their associated users, and 4) behavioural characteristics of the devices and/or their associated users connecting to that network, which all of this information is obtained from what was already know about the network from the cyber security appliance 100.

The intelligent-adversary simulator can be coded to create the virtualized version of the network and its network devices; and thus, does not degrade or compromise the actual network, or its actual network devices, under analysis when running the simulation (e.g. a vulnerability test). The virtualized network, and its network components connecting to the network, being tested during the simulation are up to date and accurate for a time the actual network under analysis is being tested and simulated because the intelligent-adversary simulator is coded to obtain actual network data collected by generally all of, but at least two or more of the 1) modules, 2) a data store, and 3) one or more AI models making up the cyber security appliance 100 protecting the actual network under analysis from cyber threats.

The intelligent-adversary simulator can be coded to simulate the compromise of a spread of the cyber threat being simulated in the simulated cyber-attack scenario on connections between the devices connected to the virtualized network. During this, the intelligent-adversary simulator can be coded to then perform one or more calculations on an ease of transmission of the cyber threat between those devices, including key network devices, on a hop between those devices.

The intelligent-adversary simulator can be coded to construct the graph of the virtualized version of the network from knowledge known and stored by the modules, the data store, and the AI models of the cyber security appliance 100 protecting the actual network under analysis. The knowledge known and stored is obtained at least from ingested traffic from the actual network under analysis.

The intelligent-adversary simulator can be coded to model a compromise by the cyber threat through the virtualized version of the network based upon how likely it would be for the cyber-attack to spread to achieve either of 1) a programmable end goal of that cyber-attack scenario set by a user or, 2) set by default an end goal scripted into the selected cyber-attack scenario, such as an end goal of compromising the most amount of possible user devices and key network devices. In an embodiment, the source device is the initial carrier of the 'compromise' (e.g. unwanted or unauthorized access by a malicious actor) that will spread down the path of least resistance in the network to achieve a purpose of that cyber-attack, which, by default, is to compromise the most amount of possible users and key network devices. Other cyber-attack scenarios may have an end goal to target specific devices associated with compromising specific users, such as Finance or Human resources, and/or compromising specific key servers deep within the network behind multiple layers of network security, and in both cases may not want to compromise as many devices as possible but compromise limited devices in a pathway to the target goal of the cyber-attack scenario in order to avoid accidental detection before reaching the specific target of the attack scenario.

FIG. 3 illustrates a block diagram of an embodiment of an intelligent-adversary simulator configured to integrate within a cyber security appliance 100 and cooperate with components within the cyber security appliance 100 installed and protecting the network from cyber threats by making use of outputs, data collected, and functionality from two or more of a data store, other modules, and one or more AI models already existing in the cyber security appliance 100. Thus, the intelligent-adversary simulator can be structurally integrated as its own block of functionality capable of running independent of some other software applications within a wider detection and response cyber security appliance 100 installed in a network to protect that network from cyber-attacks. The integration of this intelligent-adversary simulator into the cyber security appliance 100 itself makes the combined package more desirable as an all-round cyber risk, detection, and response system.

The cyber security appliance 100 can also include a profile manager module. The profile manager module can be coded to communicate and cooperate with the intelligent-adversary simulator, the one or more processors to execute its instructions, and the one or more non-transitory storage mediums to store its software and a database of profile tags. The profile manager module can be coded to maintain a profile tag on all of the devices connecting to the actual network under analysis based on their behaviour and security characteristics and then supply the profile tag for each of the devices connecting to the virtualized instance of the network when the construction of the graph occurs. Note, because the profile manager module maintains the profile tag for each device before the simulation is carried out, many simulations and cyber-attack scenario can be performed in a short amount of time, as this eliminates a need to search and query for known data about each device being simulated each time a cyber-attack scenario is run during the simulation, and need not be performed each time when the simulation is run day after day.

The profile manager module can be coded to maintain a profile tag on each device based on their behaviour as detected by i) a network module cooperating with network probes ingesting traffic data for network devices and network users in the network under analysis. Note, this network module cooperating with network probes includes, for example, an email module cooperating with email probes for ingesting email traffic data for email devices and email users, an IT network module cooperating with IT network probes ingesting traffic data, and other networks such as SaaS and Cloud. The profile manager module can be coded to maintain a profile tag on each device based on their behaviour as detected also by ii) cooperation and analysis with the Artificial Intelligence models modelling a normal pattern of life for entities in that network under analysis to obtain behavioural knowledge about each user and device in the network. Note, often portions of this behavioural knowledge from the Network module and AI models are stored in the data store, which maintains the historical data for this network. Security features and characteristics can be inferred by access lists, express security requirements detected from the network traffic, as well as inferred via logical conclusions, such as device 'n' has never had a history of communicating with key server 'Y' and thus is either not authorized to access key server 'Y' or has no connection path to key server 'Y'.

The profile tags affect a device's vulnerability rating to the 'cyber-attack' and are maintained by the profile manager module. The profile manager module regularly queries the network modules, data store, as well as the AI models modelling the normal pattern of life for the network under analysis to update the profile tag and associated vulnerability rating of each component connecting to the network. An example set of profiles created and maintained by the profile manager module cooperating with the AI models and other components can be as follows:

Anti-Virus (AV) User: A device which connects to known Antivirus endpoints. This profile gives the device a weighting of a slight 'resistance' against compromise by a cyber threat.

Human User: All human users of a device are assumed to be vulnerable in some way (more so than human-less devices); and thus, this profile gives the user and associated device(s) a weighting of a slight 'increased risk' of compromise by a cyber threat.

Link-Local Multicast Name Resolution (LLMNR) Device: A device that uses a multicast system, makes it inherently more vulnerable. Note, LLMNR can be a protocol used that allowed name resolution without the requirement of a DNS server. It can provide a hostname-to-IP based off a multicast packet sent across the network asking all listening network interfaces to reply if they are authoritatively known as the hostname in the query. This profile gives the associated device(s) a weighting of a slight 'increased risk' of compromise by a cyber threat depending on the cyber-attack scenario.

SMBv1 Server: Devices using this example outdated protocol with known vulnerabilities, makes them inherently more vulnerable. The example Server Message Block protocol Windows can facilitate file sharing on a local network. This profile gives the associated device(s) a weighting of a slight 'increased risk' of compromise by a cyber threat depending on the cyber-attack scenario.

Technical User: A user whose behaviour profile indicates they have some cyber-awareness, giving them a slight 'resistance.' Typically, these types of users are the Information systems staff in an organization.

Unencrypted Password User: a user that uses an unencrypted password and/or a same password when analysed across multiple different types of networks monitored by the cyber security appliance 100 is inherently more vulnerable. This profile gives the associated device(s) a weighting of a slight 'increased risk' of compromise by a cyber threat.

Windows XP: An example outdated Operating System with known vulnerabilities, which makes it inherently more vulnerable. This profile gives the associated device(s) a weighting of a slight 'increased risk' of compromise by a cyber threat.

The example profile tags above are non-exhaustive and more can be added to at a later date. A user interface for the intelligent-adversary simulator presents a window to allow a user to make modifications to the assigned ratings for individual components to supplement the automatically determined ratings based on what the cyber security appliance 100 knows about these components.

An Example Process for FIG. 3

1. The intelligent-adversary simulator can create a virtualization of all the devices on the network and subnets making up the network. The intelligent-adversary simulator leverages known connectivity, network traffic history and credential usage (modelled and trained on by the AI models) by cooperating with the network module and AI models in the cyber threat platform) to profile risk on actual devices in the network via virtualization of the devices and subnets making up the network and then run cyber-attack scenarios to identify the most critical assets to protect and the most pressing vulnerabilities to action. Known aspects about a device are used to identify routes to pass via (such as protocol usage, OS, credentials).

The intelligent-adversary simulator can be entirely virtualized and coded light enough in computing requirements to be run on the CPU of the cyber security appliance 100 versus needing to be run on a separate server. Cyber-attack scenarios can therefore be simulated and repeated for virtualized instances of every device connected to the virtualized network and run with a high regularity at machine speed without the actual network under analysis experiencing any interruption or significantly degrading the modules of the cyber security appliance 100 from detecting actual cyber threats. The simulations of cyber-attacks on each device connecting to the network may all be run on a single day or when the network is large enough, staggered so that all components on a first subset of the multiple subnets making up the network are run on a first day, and all devices on a second subset of the multiple subnets making up the network are run on a second day, etc.

2. After construction of the graph with all possible paths through the network and its subnets to other devices mapped out, then the intelligent-adversary simulator via its instructor component assigns weightings to the devices based on the cyber-attack scenario being simulated. Weighting coefficients can include factors such as an edge device of the network, the profile tags, the user using shared/same access credentials across multiple systems and/or networks being monitored by the cyber security appliance 100, etc.

3. The intelligent-adversary simulator traces through the graph of the virtualized network in a simulation and each device connecting to the network can have its own simulation where that device is the source device. The intelligent-adversary simulator starts from source device 'n' (it will eventually iterate through all known devices as a starting point of a compromised device). The intelligent-adversary simulator then 'moves' to the devices along, for example, the highest weighted paths as those represent the easiest paths. For these next set of devices, the process is repeated. A default end goal can be to spread to the greatest number of devices by targeting key servers that the cyber threat defence appliance has detected as communicating with the most clients in the network. A different cyber-attack scenario can have a default end goal of determining a shortest path to either 'x' amount of key servers or user specified specific key servers. The intelligent-adversary simulator performs calculations on how long it takes to compromise to achieve the end goal (as well as what key assets can be eventually accessed while achieving the end goal). For example, an example device, such as a server storing confidential personal records, may have a known vulnerability but is actually relatively cut off from the rest of the network. The intelligent-adversary simulator can factor into its analysis/calculations segmented areas of restricted subnets in a network, which could severely slow down or stop a compromised device from accessing that key device via the restricted subnets in the network even though the example key server is using outdated operating software. This methodology does factor in i) how important the vulnerability of the key server with the example confidential records is ii) in the wider scheme of the network, so the company may allocate funds to fix it properly. For more examples, a less 'important' vulnerability in one subnet might actually be, for example, i) a better route for a malicious actor to take then the device with a known outdated operating system, or ii) a more highly likely and shorter time duration to spread to many devices, etc., than a blatant vulnerability in another. Another example, most Information Systems (IS) personnel have the best and easiest access to the most sensitive and key network components, yet because they are the IS personal, some have much lower security on their personal devices than on these sensitive and key network components themselves. Note example, critical nodes can be the key servers, the devices that are in most need of security measures, and other nodes such as a bridging device found that links the, for example, the HR records, with the financial servers for budgeting and then access to sensitive engineering servers through a messaging service to an engineer. These bridging nodes connecting multiple different disciplines key network devices can be identified in the report as critical nodes in need of additional security.

Note, a network can generally be made of subnets. A subnet is a logical partition of an IP network into multiple, smaller network segments. It is typically used to subdivide large networks into smaller, more efficient subnetworks. Each subnet allows its connected devices to communicate with each other, and routers are used to communicate between subnets.

4. The intelligent-adversary simulator can then tally up the weighted paths to establish the easiest (fastest) paths from source device 'n' to, for example, key servers (See FIG. 2).

5. The intelligent-adversary simulator iterates the calculations for each device through the whole network, attempting to pass from the example starting compromised device to as many key assets as possible via the quickest device-to-device routes.

The intelligent-adversary simulator can be coded to calculate the paths of least resistance from the virtualized instance of the source device through to other virtualized instances of components of the virtualized network until reaching an end goal of the cyber-attack scenario; but not calculate every theoretically possible path from the virtualized instance of the source device to the end goal of the cyber-attack scenario, such as one or more virtualized instances of key devices in the virtualized network, each time a hop is made from one device in the virtualized network to another device in the virtualized network in order to reduce an amount of computing cycles needed by the one or more processing units as well as an amount of memory storage needed in the one or more non-transitory storage mediums. The intelligent-adversary simulator can calculate every theoretically possible path from the virtualized instance of the source device to the end goal of the cyber-attack scenario, but in an embodiment this process is limited to calculating shortest paths to indicate worse-case scenarios and a lower time duration of each simulation being run.

6 The intelligent-adversary simulator iterates a simulation through all network devices, the intelligent-adversary simulator then produces a final report of key devices that, if used as a starting point, can for example, infect the most key servers in the quickest time (and therefore most clients). Again, FIG. 2 shows a constructed graph starting from an example source device 'n' which shows the end results of a given threat hunter simulation.

FIG. 4 illustrates a diagram of an embodiment of an example page of a report from a formatting module that identifies critical devices connecting to the virtualized instance of the network that should have the priority to allocate security resources to them. FIG. 4 shows a page of the generated report with key information about the vulnerabilities, devices tested, their profiles, average days to compromise, most critical infection sources, most critical nodes for spread, etc. The vulnerabilities of the network under analysis found/used are also reported such as SMB exploits 12%, Web Exploit 16.3%, etc. The findings can be used by a human security team to understand and prioritize the most pressing vulnerabilities, and the intelligent-adversary simulator will make recommendations on those critical devices that should be addressed first in the report, such as critical infection sources on example devices 'n', 'a', 'z', etc., critical nodes for spread on example devices 'n', 'b', 'a', etc., unusual access nodes on example devices 'b', 'z', 'd', etc. The intelligent-adversary simulator makes prioritized recommendations to help human System Administrators and CISOs to allocate resources to the most pressing risks in their network. Thus, a report is produced, at the end of the simulation, to identify the most critical devices to protect as they may infect the most key assets quickest via these critical devices and the most pressing vulnerabilities to rectify internally.

The intelligent-adversary simulator itself can be coded to gather the information it needs from data sources, run the simulation(s), and then generate a detailed report with the relevant data. For example, an automated generated report can be produced highlighting things like i) the most dangerous infectee's and ii) the methods of lateral movement from those individuals to the rest of the network. The report can identify an individual and/or machine (or set of individuals and/or set of machines) in a given community (e.g. an organization) that would cause the most amount of damage to the network and/or organization if the individual and/or machine were to become infected. The intelligent-adversary simulator uses the mathematical modelling and other factors known about a system under analysis to automatically determine the individuals and/or machines most detrimental to the network and/or organization if infector or otherwise compromised, and then reports them out so that likely exploits can be assessed and preventative defences can be put in place to bolster the defences around these individuals and/or machines. The intelligent-adversary simulator is programmed then to even make suggestions as to the preventative defences that could be put in place to bolster the defences, such as critical infection sources, critical nodes for spread, unusual access nodes, etc. The intelligent-adversary simulator leverages actual network awareness (pattern of life) trained on by the AI models to generate a personalized threat report. The intelligent-adversary simulator knows functionality and content associated within a device, the device's geographical location/position within a network (potentially with user input), and level of how vulnerable this device, which can all be factored in to determining how much of risk to the network overall is any given entity under analysis.

7. As the intelligent-adversary simulator is virtualized, the user interface has programmable settings to be 1) run at regular intervals with no business disruption and 2) customized with attack methods and identified key targets. Also, the scheduling of these vulnerability test is no longer an issue because the intelligent-adversary simulator is virtualized and is not the actual network under analysis itself.

Further Customizations Via Sometimes the User Interface.

The intelligent-adversary simulator can use one or more cyber-attack scenarios stored in library of cyber-attack scenarios. An example cyber-attack scenario targets key servers on the assumption that spreading to the most devices is the goal of a malicious actor. This targeting could be pointed at different devices—as long as the user 'tags' them as key devices—to model a threat targeted on a specific fileserver or user via the user interface. The user interface presents cyber-attack scenarios that the user can choose from and/or allows the user to customize an attack on specific targets as discussed above. The speed of the attack can be increased when modelling of more advanced adversaries is being simulated in the cyber-attack scenario.

Next, as discussed, an instructor in the intelligent-adversary simulator can assign devices a defence score/coefficient weighting; alternatively, the user interface allows a user to modify a defence score/coefficient weighting to resist infection/being compromised. Note, this can be manually applied by adding profile tags to a device that make them less desirable as nodes to pass through. For example, the user may modify, to make more resistant, the defence score/coefficient rating in circumstances when a two-factor verification system is used in order to access that device.

The user interface can offer a set selection of pre-programmed vulnerabilities and a generic 'unknown' vulnerability that takes the most time to execute (to account for zero-days, social engineering attacks etc.). Additional vulnerabilities can be added to the system as discovered (or as desired by an end user) by uploading the threat profile to the system through the user interface. Additionally, as updates come to the Artificial Intelligence models trained on cyber threats can be used to update cyber-attack scenarios. The intelligent-adversary simulator cooperating with the i) the data store, ii) the modules, and iii) the one or more Artificial Intelligence models in the cyber security appliance 100 automate threat hunting on a network, that uses information from Artificial Intelligence modelling and uses the application of modelling from disease theory.

Instead of testing manually, the intelligent-adversary simulator is integrated into the cyber security appliance 100, is aware of network connections, amounts of traffic, normal pattern of life of its users, etc., and can model and determine where the most impactful weakness exist so that defences can be put in place to bolster the current cyber defences. Again, the intelligent-adversary simulator can be coded to integrate automating threat hunting on a network with Artificial Intelligence via the application of an adapt form in part form modelling of disease theory.

The intelligent-adversary simulator can determine what are the most pressing vulnerabilities to the network via user input identifying key devices on the network and a check list of generally key devices on a network. The intelligent-adversary simulator iterates through the whole virtualized network, attempting to pass from the starting compromised virtualized device to as many key virtualized assets in the virtualized network as possible via the quickest device-to-device routes. Known aspects about an actual device are used in the virtualized instance of that device to identify routes to pass via (such as protocol usage, OS, credentials). A report is produced, at the end of the simulation, of the most critical devices to protect as they may infect the most key assets quickest, and the most pressing vulnerabilities to rectify internally. As the AI Adversary simulator is virtualized, it can be run regularly with no business disruption and customized with attack methods and new key targets.

The intelligent-adversary simulator employs some red team tactics and is routinely updated with the latest attacks and red team tactics to try to exploit the vulnerabilities of network in different cyber-attack scenarios. Human Red teaming can be the process of humans using tactics, techniques, and procedures (TTPs) to emulate real-world adversaries in order to train and measure the effectiveness of the people, processes, and technology used to defend organizations. Note, Red teams conducting vulnerability testing goes as slow as human actors, manually attacking the network from each device location. This also requires an in-house employee to do the work or a hired company. In contrast, the intelligent-adversary simulator can look at all known devices at machine speed (e.g. Gigahertz which is 1,000,000,000 cycles per second) to mitigate vulnerabilities of a network. Also, the existing method of vulnerability scanning by a human Red team is not simulated so the devices are actually breached (leaving them potentially vulnerable to real adversaries). The intelligent-adversary simulator is virtualized and passive, so there is no network disruption and the devices are never really breached.

The intelligent-adversary simulator using the modules and data store of the cyber security appliance 100 has a full awareness of network connectivity and device behaviour before starting the vulnerability test to a given cyber-attack scenario. This includes full awareness of credential and historic protocol usage of all devices within the network stored in the data store. Usually, the prior human analyst starts with a series of possible attack methods and sees where they can approach from, or crawl the network searching for a way in. The intelligent-adversary simulator has the opportunity to test all possible routes because of improved time and computational limits. Furthermore, the prior human methods do not have full awareness of credential and historic protocol usage which means they may miss possible attack vectors.

The intelligent-adversary simulator can communicate and cooperate with a network reachability component to show the most at risk network locations because a) there are key vulnerabilities and infection-spread paths AND b) the automatic response module has no visibility over the subnet.

The intelligent-adversary simulator can communicate and cooperate with an AI phishing generator to test the external defences and the vulnerability of each human user which can be factored into the risk component/infection likelihood for a device.

The intelligent-adversary simulator can communicate and cooperate with Email, SaaS, Cloud, end-device/Host cyber protection systems to locate on-host weakness, users who are regularly exposed to (or fooled by) spam or phishing emails, users who are publicly facing in the SaaS environment or administrators in the SaaS/Cloud environments to find new attack vectors and possible vulnerabilities.

In an embodiment, the functional construction of the graph may include the following aspects.

The intelligent-adversary simulator assigns weighted coefficients for edges to potential source devices for the compromising virus/malware/etc. and testing is conducted to see which edge device is the first device to be compromised. Also, the intelligent-adversary simulator maps out all possible paths to key servers on subnets on the graph from a device under analysis, and then a shortest possible path to each key server is successively calculated until the compromising virus/malware/etc. spreads from itself as the source to any number from all the key servers or x amount of key servers reachable on that subgraph. The intelligent-adversary simulator calculates how long it takes to compromise each key server.

The intelligent-adversary simulator factors in the quality of the malicious adversary to change the time it takes to compromise a device.

Machine learning algorithms can combine data on the virus's spread with a neural network, to help predict when infections will spread from a particular device to key servers and eventually to possibly the entire network. For example, a k-nearest neighbour (kNN) as a classifier may be used in machine learning (i) to identify patterns of data without demanding for an exact match to known patterns. Likewise, support vector machine (SVM) learning algorithms can be used for classification for accuracy with less computation power. Likewise, use of Bayesian network (BN) for representing statistical dependencies can be used to establish pattern of life of users and devices.

Example Cyber Security Appliance

Again, FIG. 3 shows some modules of an example cyber security appliance 100. Various Artificial Intelligence models and modules of a cyber security appliance 100 cooperate to protect a system, including but not limited to an email network, from cyber threats. The cyber security appliance 100 may include a trigger module, a gatherer module, an analyser module, an assessment module, a formatting module, an autonomous report composer, a data store, one or more Artificial Intelligence models trained on potential cyber threats and their characteristics, symptoms, remediations, etc., one or more Artificial Intelligence models trained with machine learning on a normal pattern of life for entities in the network, one or more Artificial Intelligence models trained with machine learning on threat report generation, and multiple libraries of text and visual representations to cooperate the library of page templates to populate visual representations, such as graphs, and text on the pages of the threat report. An example network of an email system will be used to illustrate portions of a cyber security appliance 100.

Referring to FIG. 3, the trigger module may detect time stamped data indicating an event is occurring and then triggers that something unusual is happening. The gatherer module is triggered by specific events or alerts of i) an abnormal behaviour, ii) a suspicious activity, and iii) any combination of both. The trigger module may identify, with one or more AI models trained with machine learning on a normal email pattern of life for entities in the email network, at least one of i) an abnormal behaviour, ii) a suspicious activity, and iii) any combination of both, from one or more entities in the system.

The inline data may be gathered on the deployment when the traffic is observed. The gatherer module may initiate a collection of data to support or refute each of the one or more possible cyber threat hypotheses that could include this abnormal behaviour or suspicious activity by the one or more AI models trained on possible cyber threats. The gatherer module cooperates with a data store. The data store stores comprehensive logs for network traffic observed. These logs can be filtered with complex logical queries and each IP packet can be interrogated on a vast number of metrics in the network information stored in the data store.

The data store can store the metrics and previous threat alerts associated with network traffic for a period of time, which is, by default, at least 27 days. This corpus of data is fully searchable. The cyber security appliance 100 works with network probes to monitor network traffic and store and record the data and meta data associated with the network traffic in the data store. FIG. 7 illustrates an example cyber security appliance 100 using an intelligent-adversary simulator cooperating with a network module and network probes ingesting traffic data for network devices and network users in the network under analysis.

Referring back to FIG. 3, the gatherer module may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gatherer module for each possible hypothesis.

The gatherer module may further extract data, at the request of the analyser module, on each possible hypothetical threat that would include the abnormal behaviour or suspicious activity; and then, filter that collection of data down to relevant points of data to either 1) support or 2) refute each particular hypothesis of what the potential cyber threat, e.g. the suspicious activity and/or abnormal behaviour, relates to. The gatherer module and the data store can cooperate to store an inbound and outbound email flow received over a period of time as well as autonomous actions performed by the autonomous response module on that email flow. The gatherer module may send the filtered down relevant points of data to either 1) support or 2) refute each particular hypothesis to the analyser module, comprised of one or more algorithms used by the AI models trained with machine learning on possible cyber threats to make a determination on a probable likelihood of whether that particular hypothesis is supported or refuted.

A feedback loop of cooperation between the gatherer module and the analyser module may be used to apply one or more models trained on different aspects of this process.

The analyser module can form one or more hypotheses on what are a possible set of activities including cyber threats that could include the identified abnormal behaviour and/or suspicious activity from the trigger module with one or more AI models trained with machine learning on possible cyber threats. The analyser module may request further data from the gatherer module to perform this analysis. The analyser module can cooperate with the one or more Artificial Intelligence models trained with machine learning on the normal email pattern of life for entities in the email network to detect anomalous email which is detected as outside the usual pattern of life for each entity, such as a user, of the email network. The analyser module can cooperate with the Artificial Intelligence models trained on potential cyber threats to detect suspicious emails that exhibit traits that may suggest a malicious intent, such as phishing links, scam language, sent from suspicious domains, etc. In addition, the gatherer module and the analyser module may use a set of scripts to extract data on each possible hypothetical threat to supply to the analyser module. The gatherer module and analyser module may use a plurality of scripts to walk through a step by step process of what to collect to filter down to the relevant data points (from the potentially millions of data points occurring in the network) to make a decision what is required by the analyser module.

The analyser module may further analyse a collection of system data, including metrics data, to support or refute each of the one or more possible cyber threat hypotheses that could include the identified abnormal behaviour and/or suspicious activity data with the one or more AI models trained with machine learning on possible cyber threats. The analyser module then generates at least one or more supported possible cyber threat hypotheses from the possible set of cyber threat hypotheses as well as could include some hypotheses that were not supported/refuted.

The analyser module may get threat information from Open Source APIs as well as from databases as well as information trained into AI models. Also, probes collect the user activity and the email activity and then feed that activity to the network module to draw an understanding of the email activity and user activity in the email system.

The analyser module learns how expert humans tackle investigations into specific cyber threats. The analyser module may use i) one or more AI models and/or ii) rules-based models and iii) combinations of both that are hosted within the plug-in appliance connecting to the network.

The AI models use data sources, such as simulations, database records, and actual monitoring of different human exemplar cases, as input to train the AI model on how to make a decision. The analyser module also may utilize repetitive feedback, as time goes on, for the AI models trained with machine learning on possible cyber threats via reviewing a subsequent resulting analysis of the supported possible cyber threat hypothesis and supply that information to the training of the AI models trained with machine learning on possible cyber threats in order to reinforce the model's finding as correct or inaccurate.

Each hypothesis has various supporting points of data and other metrics associated with that possible threat, and a machine learning algorithm will look at the relevant points of data to support or refute that particular hypothesis of what the suspicious activity and/or abnormal behaviour relates to.

The analyser module may perform analysis of internal and external data including readout from machine learning models, which output a likelihood of the suspicious activity and/or abnormal behaviour related for each hypothesis on what the suspicious activity and/or abnormal behaviour relates to with other supporting data to support or refute that hypothesis.

The assessment module may assign a probability, or confidence level, of a given cyber threat hypothesis that is supported, and a threat level posed by that cyber threat hypothesis, which includes this abnormal behaviour or suspicious activity, with the one or more AI models trained on possible cyber threats. The assessment module can cooperate with the autonomous response module to determine an appropriate response to mitigate various cyber-attacks that could be occurring.

The analyser module can reference machine learning models that are trained on the normal behaviour of email activity and user activity associated with at least the email system, where the analyser module cooperates with the assessment module to determine a threat risk parameter that factors in 'the likelihood that a chain of one or more unusual behaviours of the email activity and user activity under analysis fall outside of derived normal benign behaviour;' and thus, are likely malicious behaviour.

In an example, a behavioural pattern analysis of what are the unusual behaviours of the network/system/device/user under analysis by the machine learning models may be as follows. The cyber defence system uses unusual behaviour deviating from the normal behaviour and then builds a chain of unusual behaviour and the causal links between the chain of unusual behaviour to detect cyber threats (for example see FIG. 5). FIG. 5 illustrates a block diagram of an embodiment of an example chain of unusual behaviour for the email(s) deviating from a normal pattern of life in connection with the rest of the network under analysis. The unusual pattern can be determined by filtering out what activities/events/alerts that fall within the window of what is the normal pattern of life for that network/system/device/user under analysis, and then the pattern of the behaviour of the activities/events/alerts that are left, after the filtering, can be analysed to determine whether that pattern is indicative of a behaviour of a malicious actor—human, program, or other threat. Next, the cyber defence system can go back and pull in some of the filtered out normal activities to help support or refute a possible hypothesis of whether that pattern is indicative of a behaviour of a malicious actor. The analyser module can cooperate with one or more models trained on cyber threats and their behaviour to try to determine if a potential cyber threat is causing these unusual behaviours. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber defence system is configurable in a user interface, by a user, enabling what type of automatic response actions, if any, the cyber defence system may take when different types of cyber threats, indicated by the pattern of behaviours under analysis, that are equal to or above a configurable level of threat posed by this malicious actor.

The AI models may perform by the threat detection through a probabilistic change in a normal behaviour through the application of an unsupervised Bayesian mathematical model to detect behavioural change in computers and computer networks. The core threat detection system is termed the 'Bayesian probabilistic'. The Bayesian probabilistic approach can determine periodicity in multiple time series data and identify changes across single and multiple time series data for the purpose of anomalous behaviour detection. From the email and potentially IT network raw sources of data, a large number of metrics can be derived each producing time series data for the given metric.

The detectors in the analyser module including its network module (simulator can get extract meta data from network module) and email module components can be discrete mathematical models that implement a specific mathematical method against different sets of variables with the target. Thus, each model is specifically targeted on the pattern of life of alerts and/or events coming from, for example, i) that cyber security analysis tool analysing various aspects of the emails, iii) coming from specific devices and/or users within a system, etc.

At its core, the cyber security appliance 100 mathematically characterizes what constitutes 'normal' behaviour in line with the normal pattern of life for that entity and organization based on the analysis of a large number/set of different measures of a device's network behaviour. The cyber security appliance 100 can build a sophisticated 'pattern of life'—that understands what represents normality for every person, device, email activity, and network activity in the system being protected by the cyber security appliance 100.

The assessment module may rank supported candidate cyber threat hypotheses by a combination of likelihood that this candidate cyber threat hypothesis is supported as well as a severity threat level of this incident type.

The formatting module can be coded to generate the report with the identified critical devices connecting to the virtualized instance of the network that should have the priority to allocate security resources to them, along with one or more portions of the constructed graph (See FIG. 2). The formatting module can have an autonomous email-report composer that cooperates with the various AI models and modules of the cyber security appliance 100 as well as at least a set of one or more libraries of sets of prewritten text and visual representations to populate on templates of pages in the email threat report. The autonomous email-report composer can compose an email threat report on cyber threats that is composed in a human-readable format with natural language prose, terminology, and level of detail on the cyber threats aimed at a target audience being able to understand the terminology and the detail. The modules and AI models cooperate with the autonomous email-report composer to indicate in the email threat report, for example, an email attack's 1) purpose and/or 2) targeted group (such as members of the finance team, or high-level employees).

The formatting module may format, present a rank for, and output the current email threat report, from a template of a plurality of report templates, that is outputted for a human user's consumption in a medium of, any of 1) a printable report, 2) presented digitally on a user interface, 3) in a machine readable format for further use in machine-learning reinforcement and refinement, and 4) any combination of the three.

The system may use at least three separate machine learning models. For example, a machine learning model may be trained on specific aspects of the normal pattern of life for entities in the system, such as devices, users, network traffic flow, outputs from one or more cyber security analysis tools analysing the system, etc. One or more machine learning models may also be trained on characteristics and aspects of all manner of types of cyber threats. One or more machine learning models may also be trained on composing email threat reports.

The various modules cooperate with each other, the AI models, and the data store to carry out the operations discussed herein. The trigger module, the AI models, the gatherer module, the analyser module, the assessment module, the formatting module, and the data store cooperate to improve the analysis and formalized report generation with less repetition to consume less CPU cycles, as well as doing this more efficiently and effectively than humans. For example, the modules can repetitively go through these steps and re-duplicate steps to filter and rank the one or more supported possible cyber threat hypotheses from the possible set of cyber threat hypotheses and/or compose the detailed information to populate into the email threat report.

One or more processing units are configured to execute software instructions associated with the intelligent-adversary simulator, the formatting module, other modules, and models in the cyber security appliance 100.

One or more non-transitory storage mediums are configured to store at least software associated with the intelligent-adversary simulator, the other modules, and AI models.

FIG. 6 illustrates an example cyber defence appliance using an intelligent-adversary simulator to protect an example network. The example network of computer systems 50 uses a cyber security appliance 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 100, computer 1 on the first computer system 10 has the hardware and software of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information from the lightweight probes.

The cyber security appliance 100 in computer 1 builds and maintains a dynamic, ever-changing model of the 'normal behaviour' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The threat detection system takes all the information that is available relating to this employee and establishes a 'pattern of life' for that person and the devices used by that person in that system, which is dynamically updated as more information is gathered. The 'normal' of the model of the normal pattern of life is used as a moving benchmark, allowing the system to spot behaviour on a system that seems to fall outside of this normal pattern of life, and flags this behaviour as anomalous, requiring further investigation.

The cyber security appliance 100 is built to deal with the fact that today's attackers are getting stealthier and an attacker/malicious agent may be 'hiding' in a system to ensure that they avoid raising suspicion in an end user, such as by slowing their machine down.

The cyber threat defence system builds a sophisticated 'pattern of life'—that understands what represents normality for every person, device, and network activity in the system being protected by the cyber security appliance 100.

The cyber security appliance 100 can use unsupervised machine learning to works things out without pre-defined labels. In the case of sorting a series of different entities, such as animals, the system analyses the information and works out the different classes of animals. This allows the system to handle the unexpected and embrace uncertainty when new entities and classes are examined. The system does not always know what it is looking for, but can independently classify data and detect compelling patterns.

The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behaviour to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 100 can use a Recursive Bayesian Estimation. To combine these multiple analyses of different measures of network behaviour to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviours where conventional signature-based methods fall down.

Training a model can be accomplished by having the model learn good values for all of the weights and the bias for labelled examples created by the system, and in this case; starting with no labels initially. A goal of the training of the model can be to find a set of weights and biases that have low loss, on average, across all examples.

An anomaly detection technique that can be used is supervised anomaly detection that requires a data set that has been labelled as "normal" and "abnormal" and involves training a classifier. Another anomaly detection technique that can be used is an unsupervised anomaly detection that detects anomalies in an unlabelled test data set under the assumption that the majority of the instances in the data set are normal, by looking for instances that seem to fit least to the remainder of the data set. The model representing normal behaviour from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The method, apparatus and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:
1. An apparatus, comprising:
one or more memory storage devices;

one or more processors, coupled to the one or more memory storage devices, the one or more processors configured to cause:

an intelligent-adversary simulator configured to construct a graph of a virtualized instance of a network including: i) devices connecting to the virtualized instance of the network and ii) connections and pathways through the virtualized instance of the network;

wherein the virtualized instance of the network is based on an actual network under analysis, wherein the graph of the virtualized instance of the network is constructed to run a simulated cyber-attack scenario on the virtualized instance of the network to identify one or more critical devices connecting to the virtualized instance of the network from a security standpoint;

wherein information constructed from the graph is configured to generate a report;

wherein the critical devices connecting to the virtualized instance of the network are configured to have priority to allocate security resources, at least based on information from the report and based on the simulated cyber-attack scenario; and wherein, during a simulation, the intelligent-adversary simulator is configured to calculate one or more paths of least resistance for a cyber threat in the cyber-attack scenario to compromise 1) a virtualized instance of a source device, previously compromised by the cyber threat, 2) through to other virtualized instances of components of the virtualized network, 3) until reaching an end goal of the cyber-attack scenario in the virtualized network, all of the above instances being based on historic knowledge of connectivity and behaviour patterns of users and devices within the actual network under analysis;

a formatting module configured to generate the report with the identified critical devices connecting to the virtualized instance of the network that should have the priority to allocate security resources;

one or more processing units configured to execute software instructions associated with the intelligent-adversary simulator and the formatting module;

one or more non-transitory storage mediums configured to store at least software associated with the intelligent-adversary simulator; and wherein the intelligent-adversary simulator is configured to calculate the paths of least resistance from the virtualized instance of the source device through to other virtualized instances of components of the virtualized network until reaching an end goal of the cyber-attack scenario without calculating every theoretically lengthy or difficult possible path to compromise the virtualized instances of components of the virtualized network from the virtualized instance of the source device in the end goal of the cyber-attack scenario to reduce the amount of computing cycles needed by the one or more processing units and an amount of memory storage needed in the one or more non-transitory storage mediums thereby reducing the number of times a hop is made from one device in the virtualized network to another device in the virtualized network.

2. The apparatus of claim 1, further comprising:
wherein the intelligent-adversary simulator is configured to create the graph of the virtualized network, the graph including nets and subnets, wherein two or more of the devices connecting to the virtualized network are assigned with different weighting resistances to malicious compromises from the cyber threat being simulated in the cyber-attack scenario during the simulation.

3. The apparatus of claim 1, further comprising:
wherein the intelligent-adversary simulator is configured to search and query two or more of i) a data store, ii) modules, and iii) one or more Artificial Intelligence (AI) models making up a cyber security appliance protecting the actual network under analysis from cyber threats, on what, i) the data store, ii) the modules, and iii) the one or more AI models in the cyber security appliance, already know about the network, and its components, under analysis to create the graph of the virtualize instance of the network, wherein the graph of the virtualize instance of the network is created with two or more of 1) known characteristics of the network itself, 2) pathway connections between devices on that network, 3) security features and credentials of devices and/or their associated users, and 4) behavioural characteristics of the devices and/or their associated users connecting to that network, which all of this information is obtained from what was already know about the network from the cyber security appliance.

4. The apparatus of claim 1, further comprising:
wherein the intelligent-adversary simulator is configured to create the virtualized version of the network and its network devices thereby does not degrade or compromise the actual network, or its actual network devices, under analysis when running the simulation, and wherein the virtualized network, and its network components connecting to the network, being tested during the simulation are up to date and accurate for a time the actual network under analysis is being tested and simulated because the intelligent-adversary simulator is configured to obtain actual network data collected by two or more of 1) modules, 2) a data store, and 3) one or more AI models of a cyber security appliance protecting the actual network under analysis from cyber threats.

5. The apparatus of claim 1, further comprising:
wherein the intelligent-adversary simulator is configured to simulate the compromise of a spread of the cyber threat being simulated in the simulated cyber-attack scenario on connections between the devices connected to the virtualized network, and wherein the intelligent-adversary simulator is configured to then perform a calculation on an ease of transmission of the cyber threat between those devices, including key network devices.

6. The apparatus of claim 1, further comprising:
wherein the intelligent-adversary simulator is configured to construct the graph of the virtualized version of the network from knowledge known and stored by modules, a data store, and one or more AI models of a cyber security appliance protecting an actual network under analysis, wherein the knowledge known and stored is obtained at least from ingested traffic from the actual network under analysis, and wherein the intelligent-adversary simulator is configured to model a compromise by the cyber threat through the virtualized version of the network based upon how likely it would be for the cyber-attack to spread to achieve either of 1) a programmable end goal of that cyber-attack scenario set by a user, or 2) set by default an end goal scripted into the selected cyber-attack scenario.

7. The apparatus of claim 1, further comprising:
wherein the intelligent-adversary simulator is configured to integrate within a cyber security appliance and cooperate with components within the cyber security appliance installed and protecting the network from cyber threats by using outputs, data collected, and functionality from two or more of a data store, other modules, and one or more AI models already existing in the cyber security appliance, and
wherein the comprise of the source device is an infection spread to and from the source device in the virtualized instance of the network under analysis, wherein a likelihood of the compromise is tailored and accurate to an actual device being simulated because the cyber-attack scenario is based upon security credentials and behaviour characteristics from actual traffic data fed to the modules, data store, and AI models of the cyber security appliance.

8. The apparatus of claim 1, further comprising:
a profile manager module configured to communicate and cooperate with the intelligent-adversary simulator, wherein the profile manager module is configured to maintain a profile tag on all of the devices connecting to the actual network under analysis based on their behaviour and security characteristics and supply, when the construction of the graph occurs, the profile tag for the devices connecting to the virtualized instance of the network.

9. The apparatus of claim 1, further comprising:
wherein a profile manager module is configured to maintain a profile tag for each device before the simulation is carried out thereby eliminating a need to search and query for known data about each device being simulated during the simulation, and
wherein the profile manager module is configured to maintain the profile tag on each device based on their behaviour as detected by a network module cooperating with network probes ingesting traffic data for network devices and network users in the network under analysis as well as cooperation and analysis with the AI models modelling a normal pattern of life for entities in that network under analysis.

10. The apparatus of claim 1, further comprising:
wherein the intelligent-adversary simulator is configured to search and query i) ingested network traffic data as well as ii) analysis on that network traffic data from one or more AI models within the cyber security appliance, wherein the intelligent-adversary simulator has access to and obtains actual network data from the network under analysis from the data store and the AI models of normal pattern of life for entities in the network under analysis, wherein the paths of least resistance through possible routes in this network can be computed during the simulation even when a first possible route of least resistance 1) is not previously known or 2) has not been identified by a human before to determine a spread of the cyber threat from device-to-device.

11. A method for threat hunting for cyber threat, comprising:
constructing a graph of a virtualized instance of a network including i) devices connecting to the virtualized instance of the network and ii) connections and pathways through the virtualized instance of the network with an intelligent-adversary simulator;
wherein the virtualized instance of the network is based on an actual network under analysis, wherein the graph of the virtualized instance of the network is constructed to run a simulated cyber-attack scenario on the virtualized instance of the network to identify one or more critical devices connecting to the virtualized instance of the network from a security standpoint;
wherein information constructed from the graph is configured to generate a report;
wherein the critical devices connecting to the virtualized instance of the network are configured to have priority to allocate security resources, at least based on information from the report and based on the simulated cyber-attack scenario; and
wherein, during a simulation, the intelligent-adversary simulator is configured to calculate one or more paths of least resistance for a cyber threat in the cyber-attack scenario to compromise 1) a virtualized instance of a source device, previously compromised by the cyber threat, 2) through to other virtualized instances of components of the virtualized network, 3) until reaching an end goal of the cyber-attack scenario in the virtualized network, all of the above instances being based on historic knowledge of connectivity and behaviour patterns of users and devices within the actual network under analysis;
generating the report with the identified critical devices connecting to the virtualized instance of the network that should have the priority to allocate security resources;
calculating the paths of least resistance from the virtualized instance of the source device through to other virtualized instances of components of the virtualized network until reaching an end goal of the cyber-attack scenario without calculating every theoretically lengthy or difficult possible path to compromise the virtualized instances of components of the virtualized network from the virtualized instance of the source device in the end goal of the cyber-attack scenario to reduce the amount of computing cycles needed by the one or more processing units and an amount of memory storage needed in the one or more non-transitory storage mediums thereby reducing the number of times a hop is made from one device in the virtualized network to another device in the virtualized network.

12. The method of claim 11, further comprising:
creating the graph of the virtualized network, the graph including nets and subnets with the intelligent-adversary simulator, wherein two or more of the devices connecting to the virtualized network are assigned with different weighting resistances to malicious compromise from the cyber threat being simulated in the cyber-attack scenario during the simulation.

13. The method of claim 11, further comprising:
searching and querying with the intelligent-adversary simulator:
two or more of i) a data store, ii) modules, and iii) one or more Artificial Intelligence (AI) models making up a cyber security appliance protecting the actual network under analysis from cyber threats, on what, i) the data store, ii) the modules, and iii) the one or more AI models in the cyber security appliance, already know about the network, and its components, under analysis to create the graph of the virtualize instance of the network, and
wherein the graph of the virtualize instance of the network is created with two or more of
1) known characteristics of the network itself, 2) pathway connections between devices on that network, 3) security features and credentials of devices and/or their associated users, and 4) behavioural characteristics of the devices and/or their associated users connecting to that network, which all of this information is obtained from what was already know about the network from the cyber security appliance.

14. The method of claim 11, further comprising:

creating the virtualized version of the network and its network devices with the intelligent-adversary simulator thereby not degrading or compromising the actual network, or its actual network devices, under analysis when running the simulation, and wherein the virtualized network, and its network components connecting to the network, being tested during the simulation are up to date and accurate for a time the actual network under analysis is being tested and simulated because the intelligent-adversary simulator is configured to obtain actual network data collected by two or more of 1) modules, 2) a data store, and 3) one or more AI models of a cyber security appliance protecting the actual network under analysis from cyber threats.

15. The method of claim 11, further comprising:

simulating the compromise of a spread of the cyber threat being simulated in the simulated cyber-attack scenario on connections between the devices connected to the virtualized network with the intelligent-adversary simulator, and wherein the intelligent-adversary simulator is configured to then perform a calculation on an ease of transmission of the cyber threat between those devices, including key network devices.

16. The method of claim 11, further comprising:

constructing the graph of the virtualized version of the network from knowledge known and stored by modules, a data store, and one or more AI models of a cyber security appliance protecting an actual network under analysis with the intelligent-adversary simulator, wherein the knowledge known and stored is obtained at least from ingested traffic from the actual network under analysis, and wherein the intelligent-adversary simulator is configured to model a compromise by the cyber threat through the virtualized version of the network based upon how likely it would be for the cyber-attack to spread to achieve either of 1) a programmable end goal of that cyber-attack scenario set by a user, or 2) set by default an end goal scripted into the selected cyber-attack scenario.

17. The method of claim 11, further comprising:

integrating within a cyber security appliance and cooperating with components within the cyber security appliance installed and protecting the network from cyber threats by using outputs, data collected, and functionality from two or more of a data store, other modules, and one or more AI models already existing in the cyber security appliance with the intelligent-adversary simulator, and wherein the comprise of the source device is an infection spread to and from the source device in the virtualized instance of the network under analysis, wherein a likelihood of the compromise is tailored and accurate to an actual device being simulated because the cyber-attack scenario is based upon security credentials and behaviour characteristics from actual traffic data fed to the modules, data store, and AI models of the cyber security appliance.

18. The method of claim 11, further comprising:

communicating and cooperating between the intelligent-adversary simulator and a profile manager module, wherein the profile manager module is configured to maintain a profile tag on all of the devices connecting to the actual network under analysis based on their behaviour and security characteristics and supply, when the construction of the graph occurs, the profile tag for the devices connecting to the virtualized instance of the network.

19. The method of claim 11, further comprising:

maintaining a profile tag for a plurality of devices before the simulation is carried out thereby eliminating a need to search and query for known data about each device being simulated during the simulation, and maintaining the profile tag on each device in the plurality of devices based on their behaviour as detected by a network module cooperating with network probes ingesting traffic data for network devices and network users in the network under analysis as well as cooperation and analysis with the AI models modelling a normal pattern of life for entities in that network under analysis.

20. The method of claim 11, further comprising:

searching and querying i) ingested network traffic data as well as ii) analysis on that network traffic data from one or more AI models within the cyber security appliance, accessing and obtaining actual network data from the network under analysis from the data store and the AI models of normal pattern of life for entities in the network under analysis, wherein the paths of least resistance through possible routes in this network can be computed during the simulation even when a first possible route of least resistance 1) is not previously known or 2) has not been identified by a human before to determine a spread of the cyber threat from device-to-device.

* * * * *